(12) United States Patent
Zhong et al.

(10) Patent No.: US 7,911,565 B2
(45) Date of Patent: *Mar. 22, 2011

(54) DISPLAY THAT EMITS CIRCULARLY-POLARIZED LIGHT

(75) Inventors: John Z. Zhong, Cupertino, CA (US); Wei Chen, Palo Alto, CA (US); Cheng Chen, Kent, OH (US); Victor H. E. Yin, Cupertino, CA (US); Shawn R. Gettemy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/689,762

(22) Filed: Jan. 19, 2010

(65) Prior Publication Data

US 2010/0118235 A1    May 13, 2010

Related U.S. Application Data

(62) Division of application No. 11/500,677, filed on Aug. 8, 2006, now Pat. No. 7,683,983.

(51) Int. Cl.
*G02F 1/1335* (2006.01)

(52) U.S. Cl. .......................................... 349/98; 349/96

(58) Field of Classification Search .................. None
See application file for complete search history.

(56) References Cited

U.S. PATENT DOCUMENTS

| | | | |
|---|---|---|---|
| 5,973,760 A | 10/1999 | Dehmlow | |
| 7,683,983 B2 * | 3/2010 | Zhong et al. | 349/98 |
| 2003/0076306 A1 | 4/2003 | Zadesky | |
| 2005/0237440 A1 | 10/2005 | Sugimura | |
| 2007/0008471 A1 | 1/2007 | Wang | |

* cited by examiner

*Primary Examiner* — Sung H Pak
(74) *Attorney, Agent, or Firm* — Park, Vaughan, Fleming & Dowler LLP

(57) ABSTRACT

One embodiment of the present invention provides a display that emits circularly-polarized light. This display includes a display mechanism that emits linearly-polarized light and a layer placed in the path of the linearly-polarized light. The layer receives the linearly-polarized light on one surface, converts the linearly-polarized light to circularly-polarized light, and then emits the circularly-polarized light from another surface. By emitting circularly-polarized light, the display reduces the perceived distortion found at some angles when the display is viewed through a linearly-polarizing filter.

6 Claims, 3 Drawing Sheets
(2 of 3 Drawing Sheet(s) Filed in Color)

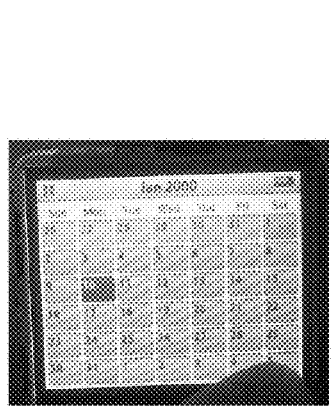
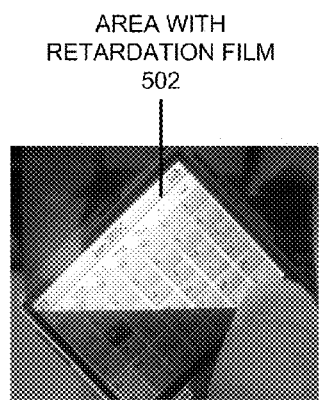
AREA WITH
RETARDATION FILM
502
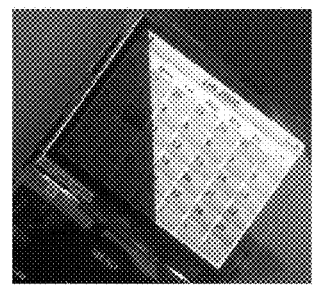
FIG. 5A FIG. 5B FIG. 5C
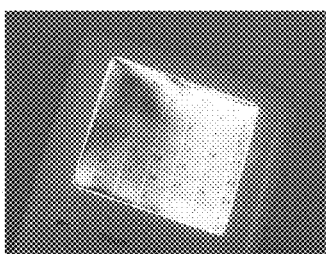
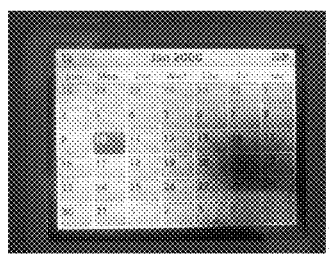
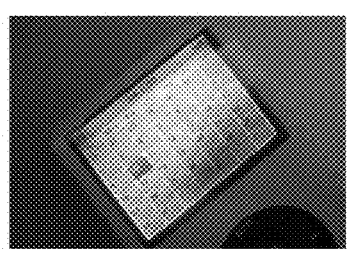
FIG. 6A FIG. 6B FIG. 6C
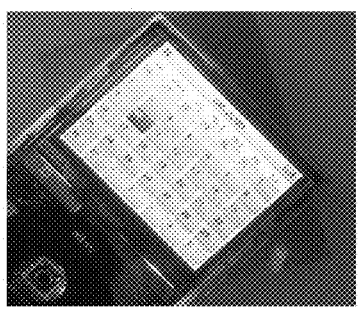
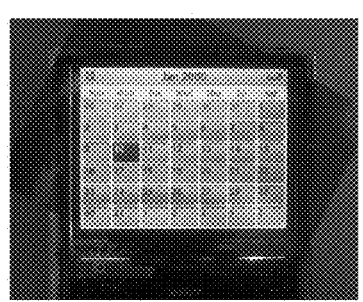
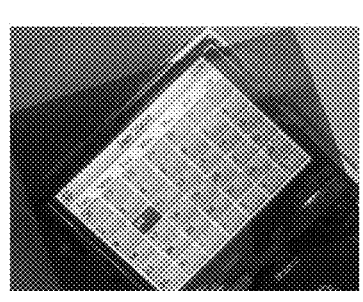
FIG. 7A FIG. 7B FIG. 7C

DISPLAY THAT EMITS CIRCULARLY-POLARIZED LIGHT

RELATED APPLICATION

This application is a divisional application of, and hereby claims priority under 35 U.S.C. §120 to, application Ser. No. 11/500,677, titled "Display that Emits Circularly Polarized Light," by inventors John Z. Zhong, Wei Chen, Cheng Chen, Victor H. E. Yin, and Shawn R. Gettemy, filed 8 Aug. 2006.

BACKGROUND

1. Field of the Invention

The present invention generally relates to liquid crystal displays. More specifically, the present invention relates to a liquid crystal display that emits circularly-polarized light and thereby reduces perceived distortion when the display is viewed through linearly-polarizing filters such as polarized sunglasses.

2. Related Art

Explosive growth in the popularity of mobile communication and computing devices has created a burgeoning demand for low-power displays. Most portable digital devices include at least one display screen to output information to users. Liquid crystal displays (LCDs), which are based on polarization optics and typically employ linear polarizers on their front surfaces, are frequently used in portable devices. LCDs emit linearly-polarized light, with an electric field that vibrates only in one direction.

The use of portable computing devices outdoors or in other bright environments can result in users viewing such devices through polarized sunglasses, which typically only allow through light with an electric field that vibrates in the vertical direction. Hence, a user looking at the LCD display of a portable device, such as a global positioning satellite (GPS) receiver, portable music player, or personal digital assistant (PDA), may see a distorted image in the display when viewed through polarized sunglasses, due to the polarized filters in the sunglasses blocking the light when the display is viewed from some angles. Depending on the angle at which the device is held or viewed, the image might be clear, completely dark, or somewhere in-between. An image might be further distorted when a lens cover is placed in front of the display for protection or industrial design, because such lens plastics are typically manufactured without good control of optical birefringence, which can result in non-uniform optical retardation. As a result, when viewed through polarized sunglasses, the image may appear to include numerous color- and gray-shade artifacts.

Hence, what is needed is an apparatus and a method for alleviating the above-described display issues.

SUMMARY

One embodiment of the present invention provides a display that emits circularly-polarized light. This display includes a display mechanism that emits linearly-polarized light and a layer placed in the path of the linearly-polarized light. The layer receives the linearly-polarized light on one surface, converts the linearly-polarized light to circularly-polarized light, and then emits the circularly-polarized light from another surface. By emitting circularly-polarized light, the display reduces the perceived distortion found at some angles when the display is viewed through a linearly-polarizing filter.

In a variation on this embodiment, the linearly-polarizing filter is a polarizing sunglass lens. In this embodiment, the portable computing devices containing such displays can hence be viewed outdoors or in other bright environments through polarized sunglasses with less perceived distortion.

In a variation on this embodiment, the layer is a retardation film with a higher refractive index in a first direction than in a second, which is perpendicular to the first direction.

In a further variation, the first direction in the retardation film is aligned 45 degrees with respect to the plane of the linearly-polarized light emitted by the display mechanism.

In a further variation, the thickness of the retardation film is tuned to convert linearly-polarized light to circularly-polarized light.

In a variation on this embodiment, the layer is: laminated on top of the display mechanism; a film in front of the display mechanism; and/or incorporated into a display cover which can be attached to the display mechanism.

In a variation on this embodiment, the display mechanism includes: a transmissive mechanism configured to actively generate and transmit light; a reflective mechanism configured to selectively reflect external light; or a trans-flective mechanism configured to both actively generate and transmit light as well as to selectively reflect external light.

In a variation on this embodiment, the display mechanism is a liquid crystal display mechanism that includes a liquid crystal layer and a polarizing layer that linearly polarizes light.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 5A illustrates a first view through polarized sunglasses of an LCD display with a retardation film placed on the upper right area of the display in accordance with an embodiment of the present invention.

FIG. 5B illustrates a second view through polarized sunglasses of an LCD display with a retardation film placed on the upper right area of the display in accordance with an embodiment of the present invention.

FIG. 5C illustrates a third view through polarized sunglasses of an LCD display with a retardation film placed on the upper right area of the display in accordance with an embodiment of the present invention.

FIG. 6A illustrates a first view through polarized sunglasses of an LCD display with an uncontrolled poly-carbonate lens cover in accordance with an embodiment of the present invention.

FIG. 6B illustrates a second view through polarized sunglasses of an LCD display with an uncontrolled poly-carbonate lens cover in accordance with an embodiment of the present invention.

FIG. 6C illustrates a third view through polarized sunglasses of an LCD display with an uncontrolled poly-carbonate lens cover in accordance with an embodiment of the present invention.

FIG. 7A illustrates a first view through polarized sunglasses of an LCD display with a retardation film in accordance with an embodiment of the present invention.

FIG. 7B illustrates a second view through polarized sunglasses of an LCD display with a retardation film in accordance with an embodiment of the present invention.

FIG. 7C illustrates a third view through polarized sunglasses of an LCD display with a retardation film in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Liquid Crystal Displays

Displays that emit linearly-polarized light, such as LCDs, may appear to include numerous color- and gray-shade artifacts when viewed at some angles through polarized filters, such as polarized sunglass lenses. Such effects can result in a negative viewing experience, especially when viewing video. This effect is especially apparent for handheld devices, which are more likely to be used outdoors and hence more likely to be viewed through polarized sunglasses. The present invention reduces such distortion and provides viewers a consistent viewing experience by using a retardation film in front of the LCD.

In one embodiment of the present invention, the retardation film is a quarter-wave retardation film with a higher refractive index in one direction, called the optical axis, than in the direction perpendicular to the optical axis. Light passing through a retardation film vibrates either along or perpendicular to the optical axis, and gains optical phase depending on the thickness of the retardation film. The thickness of a given retardation film can be chosen to provide linear polarization or circularly-polarized rotation, depending on the intended use. Circularly-polarized rotation results in isotropic light with no angular dependence, which remains visible even when viewed through polarizing filters.

Figure 1:
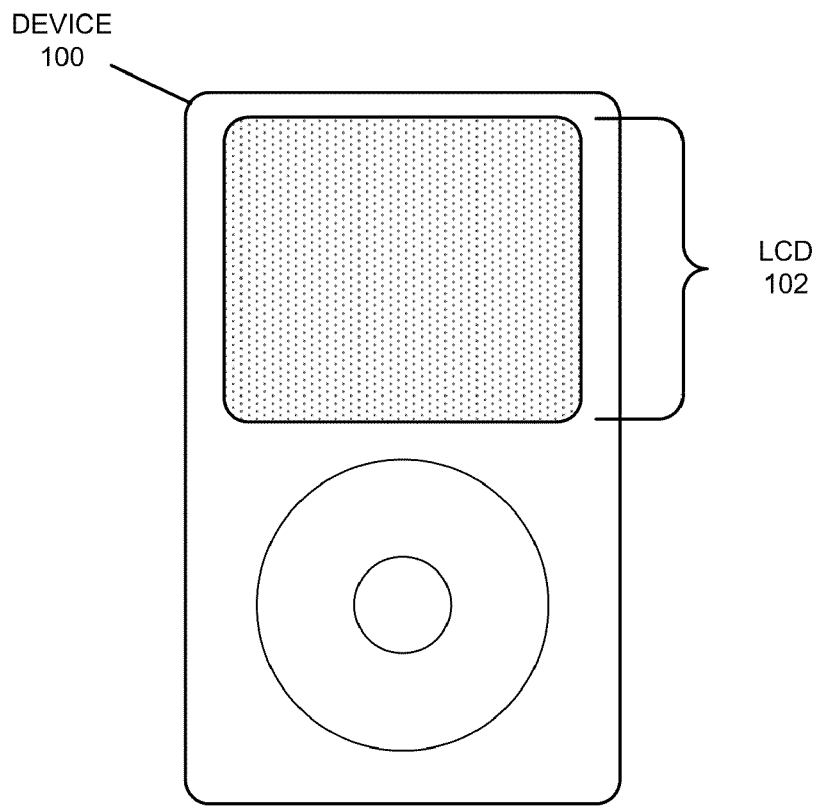
FIG. 1 illustrates a device with an LCD in accordance with an embodiment of the present invention.

FIG. 1 illustrates a device 100 with an LCD display 102.

Figure 2:
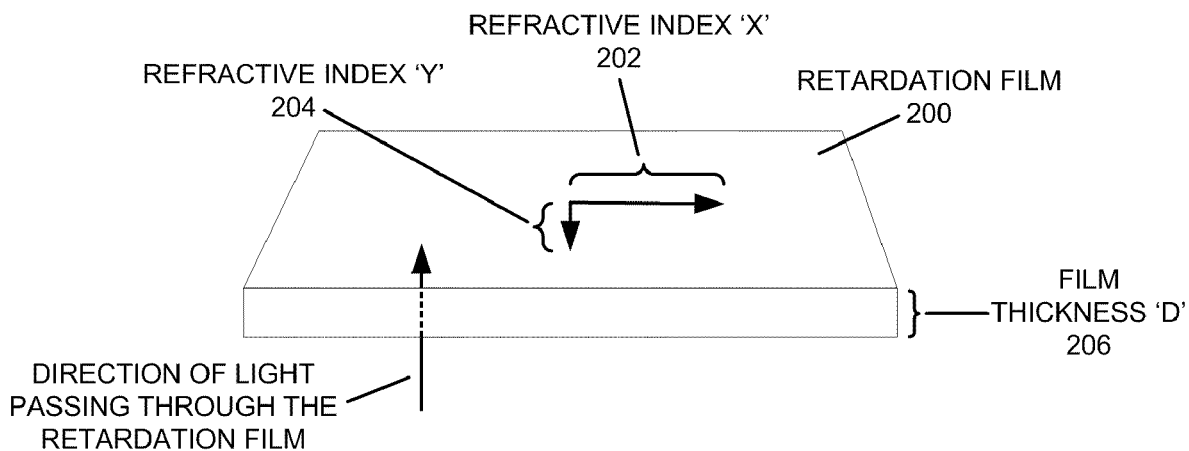
FIG. 2 illustrates a quarter-wave retardation film in accordance with an embodiment of the present invention.

FIG. 2 illustrates a quarter-wave retardation film 200 with film thickness 'D' 206. The refractive index 'X' 202, in the direction of the optical axis, is longer than the refractive index 'Y' 204, whose direction is perpendicular to the optical axis. The total phase retardation light gained when light passes through this film is equal or close to one-quarter of the wavelength of light, e.g.: $(X-Y)*d=\lambda/4$, where $\lambda$ is the wavelength of the light. The thickness of the retardation film (also known as an "A-plate") can be tuned to circularly polarize light that passes through. When used in conjunction with a display that linearly polarizes light, this film emits circularly-polarized light with consistent image quality even when viewed at different angles through a polarizing sunglass.

Figure 3:
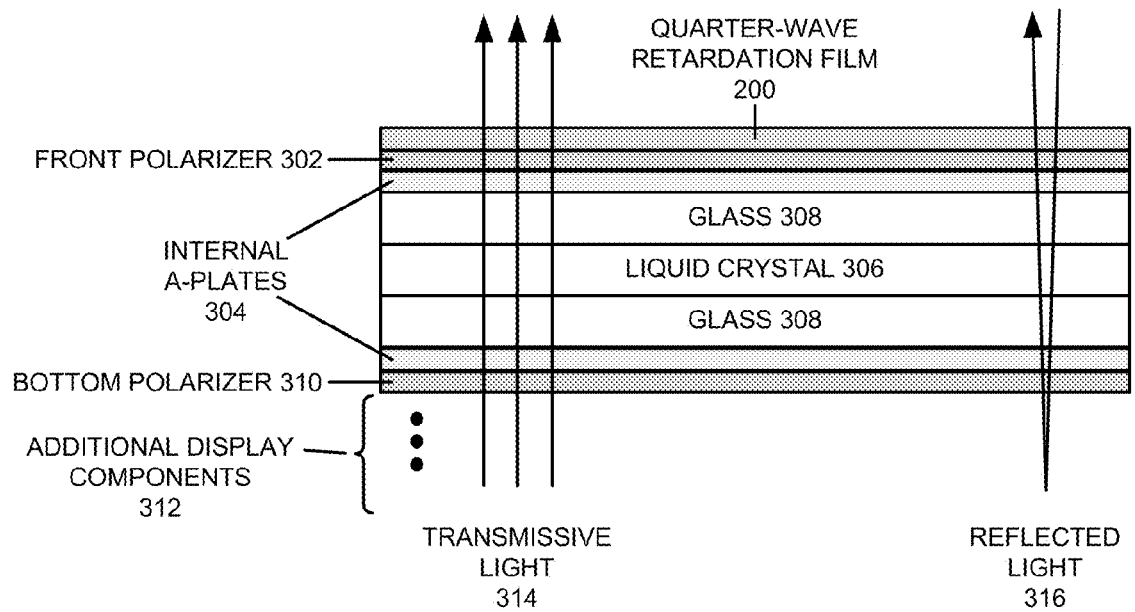
FIG. 3 illustrates a quarter-wave retardation film in proximity to an LCD in accordance with an embodiment of the present invention.

FIG. 3 illustrates a quarter-wave retardation film in proximity to a liquid crystal display. The quarter-wave retardation film 200 is in proximity to the front polarizer 302 of the LCD.

Internal A-plates 304 may also be used in the LCD, for instance to enlarge the viewing angle of the display, and may be above, below, or both above and below a liquid crystal layer 306 sandwiched between two glass layers 308. The LCD typically also includes a bottom polarizer 310. Additional display components 312 may vary depending on the type of display. For instance, the additional display components may include circuitry to control the transparency of the liquid crystal layer, a backlight that generates transmissive light 314, reflective structures that incorporate reflected light 316 in the display image, or structures that support both transmissive and reflective capabilities. Note that the technique described in the present invention can be applied to transmissive displays, reflective displays, and trans-flective displays.

In a further embodiment of the present invention, the optical axis of the retardation film is aligned 45 degrees with respect to the transmission direction of the linearly-polarized light emitted by the front polarizer 302 of the LCD display.

In one embodiment of the present invention, the retardation film can be: laminated on top of the front polarizer 302; formed as a separate film in front of the display screen; and/or incorporated into a display cover which can be attached to the display mechanism. For instance, in the third case, the film can be incorporated into a protective plastic cover, such as a protective sleeve fit over a portable music player. The film can be laminated onto a lens cover or formed through a special process during lens formation, for instance using flow-induced birefringence while injection-molding a poly-carbonate material with a directional control.

Note that addition of the film or plastic cover onto a typical mobile LCD does not adversely affect display luminance or image quality under normal (e.g. without polarized sunglasses) viewing conditions.

Figure 4:
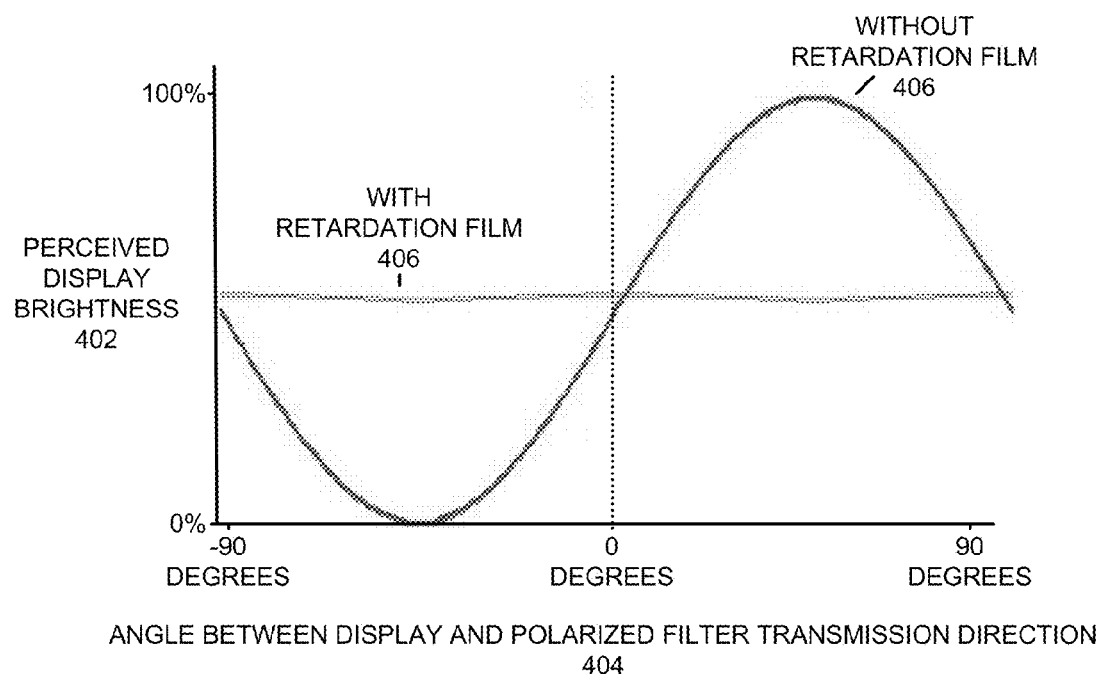
FIG. 4 illustrates perceived LCD brightness as a function of the angle between the display and the polarized filter transmission direction in accordance with an embodiment of the present invention.

FIG. 4 illustrates perceived LCD brightness as a function of the angle between the display and the polarized filter transmission direction 404, with the perceived brightness normalized to that of an LCD without a retardation film viewed without sunglasses. When viewed through a polarized filter without a retardation film 406, the perceived display brightness 402 varies widely, e.g. from no light received to full brightness on this angle, depending on this angle. When viewed through a polarized filter with a retardation film 406, the perceived display brightness is substantially regular across the range of angles. Note that while variations in thickness of the retardation film may result in small variations in brightness, such variations are typically small in high-brightness displays, and often are undetectable by human vision. Furthermore, prior art in LCD manufacturing of other display layers to reduce distortion can also be applied to minimizing such variations in thickness in the circularly-polarizing retardation film.

FIGS. 5A-5C illustrate views of an LCD display that includes a retardation film 502 (in the upper right area of the display) from different angles through polarized sunglasses. When viewed directly, as in FIG. 5A, only a small amount of distortion is visible, but the views shown in FIG. 5B and FIG. 5C show the blocking of the linearly-polarized light from the left area of the display, and the unblocked transmission of the circularly-polarized light from the right area of the display.

FIGS. 6A-6C illustrate distorted views of an LCD display with an uncontrolled poly-carbonate lens cover when viewed at different angles through polarized sunglasses.

FIGS. 7A-7C illustrate views of an LCD display with a sunglass-friendly retardation film when viewed at different angles through polarized sunglasses. Note that these views are not distorted or varied at different viewing angles.

In summary, one embodiment of the present invention uses a retardation film to circularly polarize light emitted by a display that emits linearly-polarized light. By circularly polarizing light, the retardation film allows the display to be viewed at different angles through polarized filters, such as those found in polarizing sunglasses, without perceived distortion.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computing device that includes:
a computational engine;
a memory-based storage system; and
a display used to present information;
wherein the display includes:
a display mechanism that emits linearly-polarized light;
a layer that circularly polarizes light which is placed in the path of the linearly-polarized light, so that the layer converts the linearly-polarized light to circularly-polarized light;
one or more a-plates coupled to the layer that circularly polarizes light; and
wherein the display reduces perceived distortion when the display is viewed through a linearly-polarizing filter.

2. The computing device of claim 1,
wherein the computing device is a portable computing device, which can be used outdoors or in other bright environments; and
wherein the linearly-polarizing filter is a polarizing sunglass lens.

3. The computing device of claim 1,
wherein the layer comprises a retardation film;
wherein the retardation film has a higher refractive index in a first direction than in a second direction perpendicular to the first direction;
wherein the first direction in the retardation film is aligned 45 degrees with respect to the plane of the linearly-polarized light emitted by the display mechanism; and
wherein the thickness of the retardation film is tuned to convert linearly-polarized light to circularly-polarized light.

4. The computing device of claim 1, wherein the layer is:
laminated on top of the display mechanism;
a film in front of the display mechanism; and/or
incorporated into a display cover which can be attached to the display mechanism.

5. The computing device of claim 1, wherein the display mechanism includes:
a transmissive mechanism configured to actively generate and transmit light;
a reflective mechanism configured to selectively reflect external light; or
a trans-flective mechanism configured to both actively generate and transmit light as well as selectively reflect external light.

6. The computing device of claim 1, wherein the display mechanism is a liquid crystal display mechanism that further comprises:
a liquid crystal layer; and
a polarizing layer that linearly polarizes light.

\* \* \* \* \*